(12) United States Patent
Sun et al.

(10) Patent No.: US 10,944,493 B2
(45) Date of Patent: Mar. 9, 2021

(54) MONITORING VIDEO BROADCASTS

(71) Applicant: Advanced New Technologies Co., Ltd., Grand Cayman (KY)

(72) Inventors: Jiankang Sun, Hangzhou (CN); Feng Lin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/805,531

(22) Filed: Feb. 28, 2020

(65) Prior Publication Data

US 2020/0382230 A1 Dec. 3, 2020

Related U.S. Application Data

(63) Continuation of application No. PCT/CN2020/071111, filed on Jan. 9, 2020.

(30) Foreign Application Priority Data

May 30, 2019 (CN) .......................... 201910460236.6

(51) Int. Cl.
 *H04H 60/31* (2008.01)
 *G06K 9/00* (2006.01)
 *H04H 60/33* (2008.01)

(52) U.S. Cl.
 CPC ......... *H04H 60/31* (2013.01); *G06K 9/00744* (2013.01); *G06K 9/00758* (2013.01); *H04H 60/33* (2013.01)

(58) Field of Classification Search
 CPC ......... H04N 21/23418; H04N 21/2347; H04N 21/237; H04N 21/25841; H04N 21/26241;

(Continued)

(56) References Cited

U.S. PATENT DOCUMENTS

2017/0026671 A1* 1/2017 Neumeier .......... H04N 21/4667
2019/0261063 A1* 8/2019 Woodman ........ H04N 21/44008

FOREIGN PATENT DOCUMENTS

CN          1556518      12/2004
CN        101500150       8/2009

(Continued)

OTHER PUBLICATIONS

PCT International Search Report and Written Opinion in International Application No. PCT/CN2020/071111, dated Apr. 15, 2020, 18 pages (with machine translation).

(Continued)

*Primary Examiner* — Rong Le
(74) *Attorney, Agent, or Firm* — Fish & Richardson P.C.

(57) ABSTRACT

Implementations of this disclosure provide for video broadcast monitoring. An example method performed by a video broadcast monitoring device includes obtaining a first video that is provided by a video output device for presentation by a video display device; obtaining first characteristic information of a second video, the second video being a video that is to be monitored by the video broadcast monitoring device, and the first characteristic information indicating pixel change characteristics of the second video; determining, based on the first characteristic information, whether the first video matches the second video, to obtain a result of the determining; generating monitoring information that includes the result of the determining; and providing the monitoring information to a server.

15 Claims, 6 Drawing Sheets

(58) Field of Classification Search
CPC ......... H04N 21/4394; H04N 21/44008; H04N 21/44204; H04N 21/44213; H04N 21/4532; H04N 21/462; H04N 21/4667; H04N 21/478; H04N 21/6125; H04N 21/6175; H04N 21/812; H04N 21/8126; H04N 21/8456; H04N 21/8586; H04N 5/44591

See application file for complete search history.

(56) References Cited

FOREIGN PATENT DOCUMENTS

| | | |
|---|---|---|
| CN | 104410907 | 3/2015 |
| CN | 104636505 | 5/2015 |
| CN | 104661087 | 5/2015 |
| CN | 105245950 | 1/2016 |
| CN | 108965931 | 12/2018 |
| CN | 110234022 | 9/2019 |
| JP | 2003316689 | 11/2003 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

\* cited by examiner

MONITORING VIDEO BROADCASTS

CROSS-REFERENCE TO RELATED APPLICATIONS

This application is a continuation of PCT Application No. PCT/CN2020/071111, filed on Jan. 9, 2020, which claims priority to Chinese Patent Application No. 201910460236.6, filed on May 30, 2019, and each application is hereby incorporated by reference in its entirety.

TECHNICAL FIELD

The present application relates to the field of computer technologies, and in particular, to video broadcast monitoring methods, devices, systems and equipment.

BACKGROUND

When an advertiser circulates an advertisement offline, the advertisement is usually played on multiple screens at the same time, and it may be difficult for the advertiser to determine whether the advertisement is played on all placed screens. In the existing technology, advertisement verification is implemented as follows: An advertiser requests an advertisement publisher to perform manual on-site viewing, and perform on-site photographing or video shooting, so as to prove that a specified advertisement is played.

However, when the advertisement is played on too many screens, the broadcast monitoring method in the existing technology consumes lots of labor costs and is inefficient.

SUMMARY

In view of this, implementations of the present application provide video broadcast monitoring methods, devices, systems and equipment, so as to automatically complete an accurate monitoring process and improve advertisement verification efficiency.

To alleviate the previous technical problem, the implementations of the present specification are implemented as described below.

An implementation of the present specification provides a video broadcast monitoring method, including: obtaining, by a video broadcast monitoring device, a first video input that is submitted by a video output device to a video display device; obtaining, by the video broadcast monitoring device, first characteristic information of a second video, where the second video is a video that is to be monitored, e.g., as specified by a user of a server, and the first characteristic information is used to indicate pixel change characteristics of the second video; determining, based on the first characteristic information, whether the first video matches the second video, to obtain a determining result; generating monitoring information based on the determining result; and submitting the monitoring information to a first server.

An implementation of the present specification provides a video broadcast monitoring prompt information generation method, including: receiving, by a server, monitoring information submitted by a video broadcast monitoring device, where the video broadcast monitoring device is configured to monitor a video streaming status of a video display device, the monitoring information is generated by the video broadcast monitoring device based on a determining result after determining, based on obtained first characteristic information, whether a first video matches a second video to obtain the determining result, the second video is a video that is to be monitored, e.g., as specified by a user of the server, and the first characteristic information is used to indicate pixel change characteristics of the second video; and generating prompt information based on the monitoring information, where the prompt information is used to indicate a streaming status of the second video on the video display device within a specified time period; and sending the prompt information to a terminal corresponding to the user of the server.

An implementation of the present specification provides a video broadcast monitoring method, including: obtaining, by a video broadcast monitoring device, a first video input that is submitted by a video output device to a video display device; obtaining, by the video broadcast monitoring device, first characteristic information of a second video, where the second video is a video that is to be monitored, e.g., as specified by a user of a server, and the first characteristic information is used to indicate pixel change characteristics of the second video; determining, based on the first characteristic information, whether the first video matches the second monitoring information video, to obtain a determining result; generating monitoring information based on the determining result; submitting the monitoring information to the first server; receiving, by the first server, the monitoring information submitted by the video broadcast monitoring device; generating prompt information based on the monitoring information, where the prompt information is used to indicate a streaming status of the second video on the video display device within a specified time period; and sending the prompt information to a terminal corresponding to the user of the server.

An implementation of the present specification provides a video broadcast monitoring device, including: a first acquisition module, configured to obtain, by a video broadcast monitoring device, a first video input that is submitted by a video output device to a video display device; a second acquisition module, configured to obtain, by the video broadcast monitoring device, first characteristic information of a second video, where the second video is a video that is to be monitored, e.g., as specified by a user of a server, and the first characteristic information is used to indicate pixel change characteristics of the second video; a determining module, configured to determine, based on the first characteristic information, whether the first video matches the second video, to obtain a determining result; a monitoring information generation module, configured to generate monitoring information based on the determining result; and a monitoring information submitting module, configured to submit the monitoring information to a first server.

An implementation of the present specification provides a video broadcast monitoring prompt information generation device, including: a monitoring information receiving module, configured to receive, by a server, monitoring information submitted by a video broadcast monitoring device, where the video broadcast monitoring device is configured to monitor a video streaming status of a video display device, the monitoring information is generated by the video broadcast monitoring device based on a determining result after determining, based on obtained first characteristic information, whether a first video matches a second video to obtain the determining result, the second video is a video that is to be monitored, e.g., as specified by a user of the server, and the first characteristic information is used to indicate pixel change characteristics of the second video; a prompt information generation module, configured to generate prompt information based on the monitoring information, where the prompt information is used to indicate a streaming status of the second video on the video display device within a specified time period; and a prompt information sending module, configured to send the prompt information to a terminal corresponding to the user of the server.

An implementation of the present specification provides a video broadcast monitoring system, including a video broadcast monitoring device, a first server, and a video output device, where the video broadcast monitoring device includes: a first acquisition module, configured to obtain, by the video broadcast monitoring device, a first video input that is submitted by the video output device to a video display device; a second acquisition module, configured to obtain, by the video broadcast monitoring device, first characteristic information of a second video, where the second video is a video that is to be monitored, e.g., as specified by a user of the server, and the first characteristic information is used to indicate pixel change characteristics of the second video; a determining module, configured to determine, based on the first characteristic information, whether the first video matches the second video, to obtain a determining result; a monitoring information generation module, configured to generate monitoring information based on the determining result; and a monitoring information submitting module, configured to submit the monitoring information to the first server; and the first server includes: a monitoring information receiving module, configured to receive the monitoring information submitted by the video broadcast monitoring device, where the video broadcast monitoring device is configured to monitor a video streaming status of the video display device; a prompt information generation module, configured to generate prompt information based on the monitoring information, where the prompt information is used to indicate a streaming status of the second video on the video display device within a specified time period; and a prompt information sending module, configured to send the prompt information to a terminal corresponding to the user of the server.

An implementation of the present specification provides a video broadcast monitoring device, including: at least one processor; and a memory communicatively connected to the at least one processor; where the memory stores instructions that can be executed by the at least one processor, and the instructions are executed by the at least one processor, to enable the at least one processor to: obtain, by the video broadcast monitoring device, a first video input that is submitted by a video output device to a video display device; obtain, by the video broadcast monitoring device, first characteristic information of a second video, where the second video is a video that is to be monitored, e.g., as specified by a user of a server, and the first characteristic information is used to indicate pixel change characteristics of the second video; determine, based on the first characteristic information, whether the first video matches the second video, to obtain a determining result; generate monitoring information based on the determining result; and submit the monitoring information to a first server.

An implementation of the present specification provides a video broadcast monitoring prompt information generation device, including: at least one processor; and a memory communicatively connected to the at least one processor; where the memory stores instructions that can be executed by the at least one processor, and the instructions are executed by the at least one processor, to enable the at least one processor to: receive, by a server, monitoring information submitted by a video broadcast monitoring device, where the video broadcast monitoring device is configured to monitor a video streaming status of a video display device, the monitoring information is generated by the video broadcast monitoring device based on a determining result after determining, based on obtained first characteristic information, whether a first video matches a second video to obtain the determining result, the second video is a video that is to be monitored, e.g., as specified by a user of the server, and the first characteristic information is used to indicate pixel change characteristics of the second video; and generate prompt information based on the monitoring information, where the prompt information is used to indicate a streaming status of the second video on the video display device within a specified time period; and send the prompt information to a terminal corresponding to the user of the server.

An implementation of the present specification provides a video broadcast monitoring system, including: a video broadcast monitoring device, a first server, and a video output device; and the video broadcast monitoring device includes: at least one first processor; and a first memory communicatively connected to the at least one first processor; where the first memory stores first instructions that can be executed by the at least one first processor, and the first instructions are executed by the at least one first processor, to enable the at least one first processor to: obtain, by the video broadcast monitoring device, a first video input that is submitted by the video output device to a video display device; obtain, by the video broadcast monitoring device, first characteristic information of a second video, where the second video is a video that is to be monitored, e.g., as specified by a user of the server, and the first characteristic information is used to indicate pixel change characteristics of the second video; determine, based on the first characteristic information, whether the first video matches the second video, to obtain a determining result; generate monitoring information based on the determining result; and submit the monitoring information to the first server; and the first server includes: at least one second processor; and a second memory communicatively connected to the at least one second processor; where the second memory stores second instructions that can be executed by the at least one second processor, and the second instructions are executed by the at least one second processor, to enable the at least one second processor to: receive, by a server, monitoring information submitted by the video broadcast monitoring device, where the video broadcast monitoring device is configured to monitor a video streaming status of the video display device, the monitoring information is generated by the video broadcast monitoring device based on a determining result after determining, based on obtained first characteristic information, whether the first video matches the second video to obtain the determining result, the second video is a video that is to be monitored, e.g., as specified by the user of the server, and the first characteristic information is used to indicate pixel change characteristics of the second video; and generate prompt information based on the monitoring information, where the prompt information is used to indicate a streaming status of the second video on the video display device within a specified time period; and send the prompt information to a terminal corresponding to the user of the server.

The previous at least one technical solution used in the implementations of the present specification can achieve the following beneficial effects: The video broadcast monitoring device receives the first characteristic information sent by the first server, and determines, based on the first characteristic information, whether the first video submitted by the video output device matches the second video that is specified to be monitored, so as to determine, based on the determining result, whether the video display device appropriately displays the second video within the specified time period. As such, an automatic broadcast monitoring process can be accurately completed, and advertisement verification efficiency can be improved.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to specific implementations and accompanying drawings of the present application. Clearly, the described implementations are merely some rather than all of the implementations of the present application. All other implementations obtained by a person of ordinary skill in the art based on the implementations of the present application without creative efforts shall fall within the protection scope of the present application.

The technical solutions provided in the present application are described in detail below with reference to the accompanying drawings.

Figure 1:
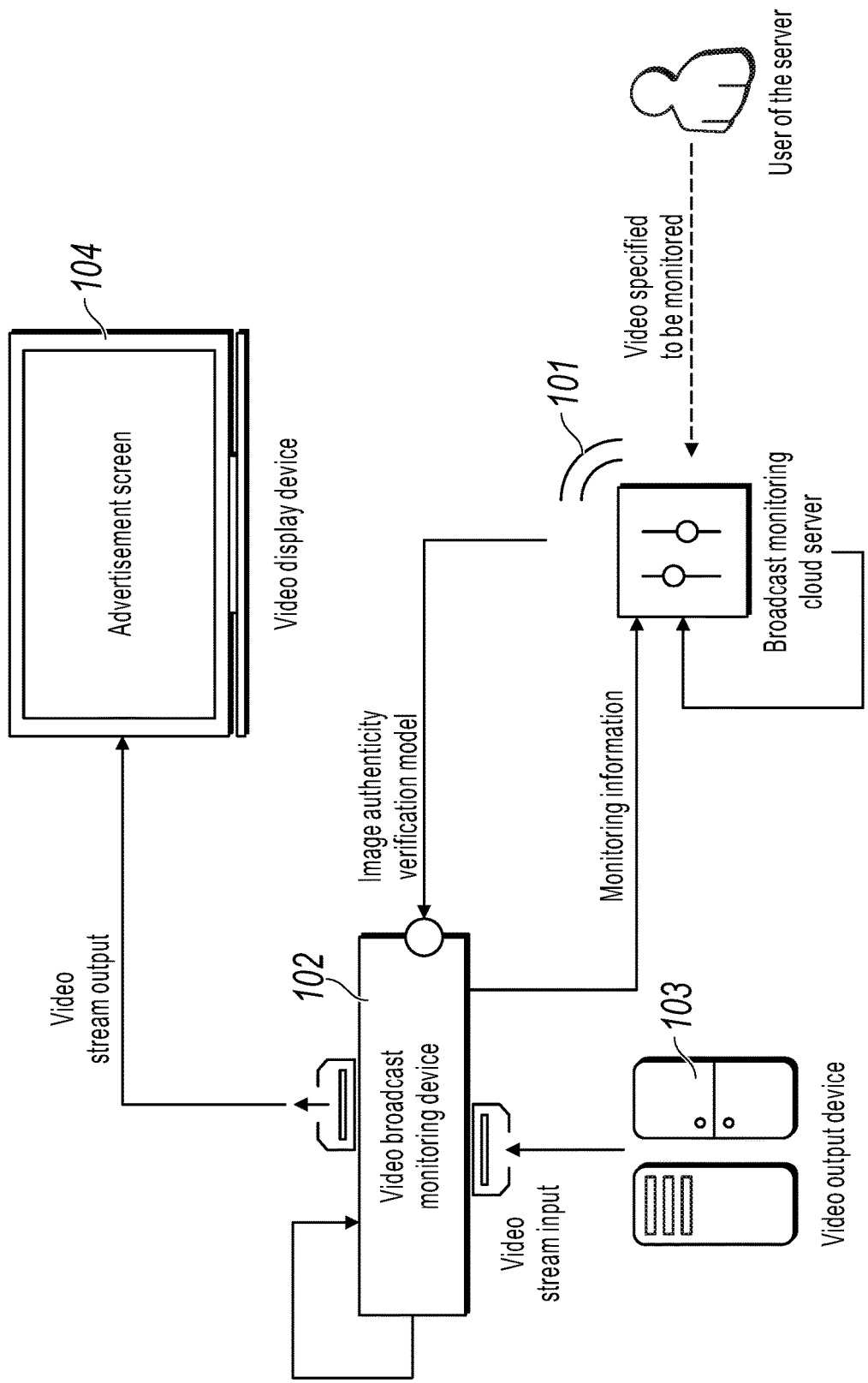
FIG. 1 is an architectural diagram illustrating a video broadcast monitoring system, according to an implementation of the present specification.

In the existing technology, a video advertisement required by an advertiser to be played is played by an offline electronic advertisement screen, and it is difficult for the advertiser to determine whether the advertisement is played on a corresponding advertisement screen as required. In the existing technology, an advertisement is monitored and played as follows: An advertiser requests an advertisement publisher to perform manual on-site viewing, and perform on-site photographing or video shooting, so as to prove that a specified advertisement is played. However, in the existing technology, a manual on-site survey method is inefficient, and consumes lots of labor costs. FIG. 1 is an architectural diagram illustrating a video broadcast monitoring system, according to an implementation of the present specification.

As shown in FIG. 1, the system includes: a first server, i.e., a broadcast monitoring cloud server 101, a video broadcast monitoring device 102, a video output device 103, and a video display device 104.

First, a terminal of a user of the server submits a specified video that is to be monitored (a second video) to the broadcast monitoring cloud server 101. The broadcast monitoring cloud server 101 analyzes the received second video to obtain an image authenticity verification model (which can also be referred to as first characteristic information) corresponding to the second video, and submits the image authenticity verification model to the video broadcast monitoring device 102 on an advertisement display side. The video broadcast monitoring device 102 obtains a first video input that is submitted by the video output device 103. The video output device 103 mentioned here is only used to explain the technical solution in this implementation, and does not limit the technical solution in the present disclosure. The video output device 103 mentioned in this solution can be a local server or another device that can transmit a video to the video broadcast monitoring device 102.

After obtaining the first video input that is submitted by the video output device 103, the video broadcast monitoring device 102 determines, based on the image authenticity verification model submitted by the broadcast monitoring cloud server 101, whether the first video is the same as the second video specified to be monitored, and submits a determining result and stream time period information to the broadcast monitoring cloud server 101. In an actual operation process, the video broadcast monitoring device 102 can submit the determining result and the stream time period information to the broadcast monitoring cloud server 101, or can submit the determining result and the stream time period information to another server having a receiving function. When the video broadcast monitoring device 102 submits the determining result and the stream time period information to the broadcast monitoring cloud server 101, it means that the broadcast monitoring cloud server 101 can receive the video specified by a terminal of the user of the server, and analyze the video to obtain the image authenticity verification model; after submitting the image authenticity verification model to the video broadcast monitoring device 102, is responsible for receiving subsequent feedback information from the video broadcast monitoring device 102. When the video broadcast monitoring device 102 submits the determining result and the stream time period information to another server having a receiving function, it is equivalent to adding a server to be responsible for receiving subsequent feedback information from the video broadcast monitoring device 102 in a specific implementation process.

After receiving monitoring information submitted by the video broadcast monitoring device 102, the video output device 103 or a server other than the video output device 103 generates corresponding prompt information. The prompt information here can be used to notify the user of the server that the video display device 104 plays the second video as required, or can be used to notify a user or operator of the system that the video display device 104 does not play the second video as required. Cases in which the video display device 104 does not play the second video as required can include but are not limited to the following cases:

First, the video display device 104 plays the second video, but does not play the second video within a specified time period. For example, the specified stream time period is 12:00 to 15:00, but it is monitored that a time period in which the video display device 104 plays the second video is 19:00 to 19:30.

Second, the video display device 104 plays the second video in the specified time period, but overall length of streaming does not satisfy predetermined length.

Third, the video display device 104 does not play the second video in any time period monitored.

The technical solutions provided in the implementations of this solution can be applied to the video broadcast monitoring system architecture in FIG. 1. The following describes in detail the technical solutions provided in the implementations of the present application with reference to the accompanying drawings.

Implementation 1

Figure 2:
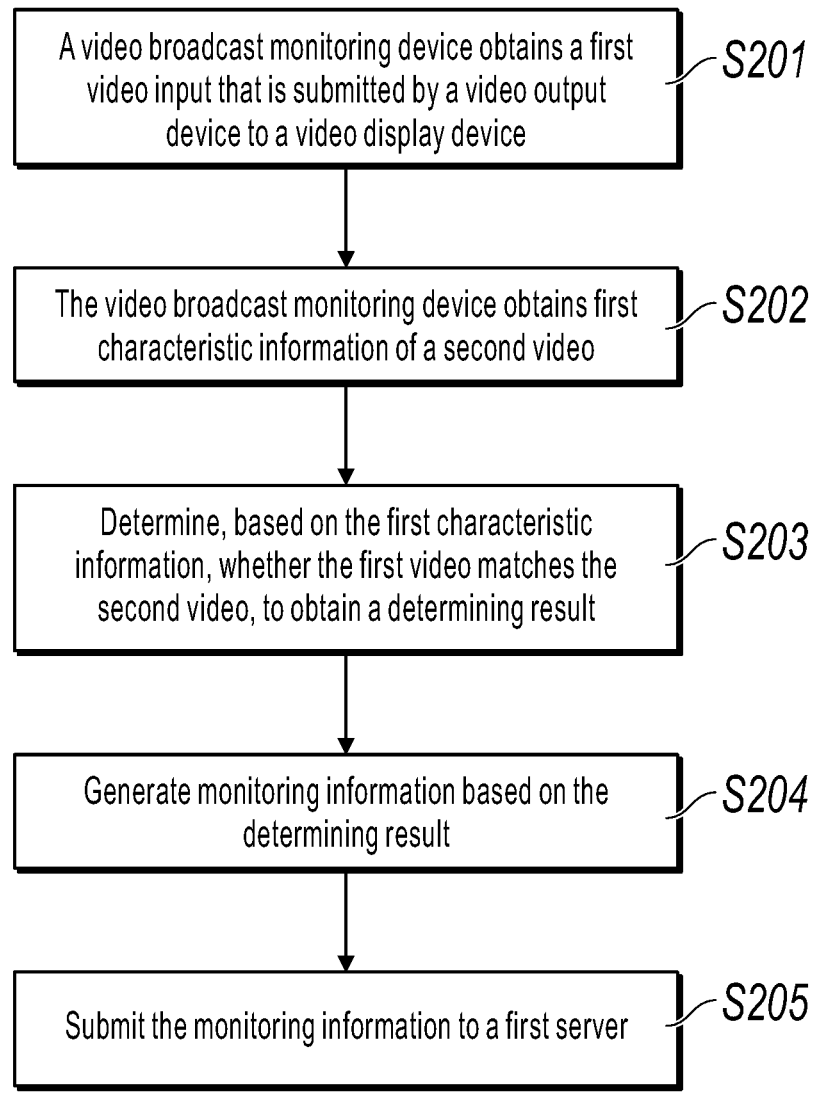
FIG. 2 is a schematic flowchart illustrating a video broadcast monitoring method, according to Implementation 1 of the present specification.

FIG. 2 is a schematic flowchart illustrating a video broadcast monitoring method, according to Implementation 1 of the present specification. From a program perspective, the process can be executed by a program or an application client of the video broadcast monitoring device 102 that is contained in the video broadcast monitoring system architecture.

As shown in FIG. 2, the video broadcast monitoring method can include the following steps:

S201. A video broadcast monitoring device obtains a first video input that is submitted by a video output device to a video display device.

The video output device mentioned in this solution can be a local server, or can be another device that can remotely control the video broadcast monitoring device or the video display device and that has a transmission function. The video output device inputs the first video to the video display device, where the first video can be a video to be published by an advertisement publisher here.

Before the video broadcast monitoring device obtains the first video input that is submitted by the video output device to the video display device, the method can further include: receiving first characteristic information sent by a first server, where the first characteristic information is obtained by the first server by analyzing a second video.

The video broadcast monitoring device can be installed in a public place and connected to an electronic advertisement screen, and is configured to monitor a video stream played by an advertisement screen or the video display device.

In the solution of the present disclosure, the first server (a broadcast monitoring cloud server) is responsible for sending the first characteristic information to the video broadcast monitoring device. The first characteristic information mentioned here can be pixel change characteristics or a rule of the second video in a playback process, and is represented by an image authenticity verification model of the video. The image authenticity verification model is obtained by the first server by analyzing the second video that is specified to be monitored.

Receiving first characteristic information sent by a first server can specifically include: receiving, by the video broadcast monitoring device, an image authenticity verification model sent by the first server, where the image authenticity verification model is used to indicate a pixel change rule of pixels in the second video that satisfy one or more predetermined criteria.

Specifically, when the image authenticity verification model is determined, a fluctuation change rate of each pixel (RGB value: three values from 0 to 256) in an output image is recorded based on an image change process before and after video playback, some video pixel bits (which can be about 5 to 10 pixel bits) with a relatively large pixel change rate are calculated, and pixel change processes of these pixel bits in the video are used as the video advertisement authenticity verification model. For example, assume that a pixel change relationship of all pixels in the second video is collected through statistics, and pixels with a relatively high pixel change degree are selected by pixel change degree. Assume that a predetermined number is 6, and the selected pixel bits are A, B, C, D, E, and F. Pixel change characteristics of the six pixels are summarized and analyzed as the first characteristic information.

The server that sends the first characteristic information to the video broadcast monitoring device can be the broadcast monitoring cloud server or the first server, or can be a server other than the first server. In the implementation of this solution, the second video is analyzed to obtain the first characteristic information, and the first characteristic information is sent to a server of the video broadcast monitoring device, and this server and a server for receiving the monitoring information sent by the video display device can be the same server or can be different servers.

S202. The video broadcast monitoring device obtains first characteristic information of a second video, where the second video is a video that is to be monitored, e.g., as specified by a user of the system, and the first characteristic information is used to indicate pixel change characteristics of the second video.

S203. Determine, based on the first characteristic information, whether the first video matches the second video, to obtain a determining result.

A determining process can be performed by the video broadcast monitoring device. The video output device submits the first video to the video broadcast monitoring device. The video broadcast monitoring device determines, based on the first characteristic information transmitted by the first server, whether the second video matches the first video, to obtain the determining result. The determining process can specifically include: determining a pixel change degree of each pixel in the first video; determining, from the pixels, a set of pixels that satisfy one or more predetermined criteria of the pixel change degree; determining second characteristic information of the set of pixels, where the second characteristic information is used to indicate pixel change characteristics of the first video; and determining whether the second characteristic information matches the first characteristic information, to obtain a determining result.

There are multiple frames of images in the video, and there are several pixels in each frame of image. Therefore, determining a pixel change degree of each pixel in the first video can be specifically implemented in the following method:

First, a pixel in each frame of image in the video needs to be obtained, and then pixel change degree information of the same pixel in continuous frames of images needs to be determined, where the pixel change degree information can represent a pixel change status of each pixel in each frame of image. For example, a pixel RGB value of pixel 1 in the ith frame of image is red 200, green 220, and blue 200, and a pixel RGB value of pixel 1 in the (i+1)th frame of image is red 220, green 260, and blue 240. In this case, a pixel change degree value of pixel 1 in the two frames of images is red 20, green 40, and blue 40.

The first characteristic information and the second characteristic information can include pixel type information and pixel change degree information. For the previous example, the pixel change characteristic information can be represented as: A pixel change degree value of pixel 1 from the ith frame of image to the (i+1)th frame of image is red 20, green 40, and blue 40. Therefore, a pixel change process of each pixel in the video in continuous frames of images can be used as the second characteristic information. Whether the second characteristic information matches the first characteristic information is determined to obtain the determining result. The determining result can include a matching success and a matching failure. If the matching succeeds, it can be considered that a video monitored by the video broadcast monitoring device is the second video. If the matching fails, it can be considered that the video monitored by the video broadcast monitoring device is not the second video that the advertiser requests to play.

For example, the advertiser requires the advertisement publisher to play second video X as required, and the video user of the server submits second video X specified by the advertiser to the first server. After analyzing second video X, the first server obtains first characteristic information and submits the first characteristic information to the video broadcast monitoring device. The video broadcast monitoring device also receives first video Y submitted by the video output device. In this case, a task of the video broadcast monitoring device is to determine whether the actually played video (that is, the first video) is the same as the specified video (that is, the second video). When the two videos are compared, a specific method is to obtain video characteristic information in the two videos, and compare the characteristic information of the two videos. For example, the video characteristic information of second video X is A1, and the video characteristic information of first video Y is A2. To compare whether the two videos are the same, it is only necessary to compare whether A1 and A2 satisfy a matching condition.

S204. Generate monitoring information based on the determining result. In specific applications, the determining result includes two cases: The second characteristic information and the first characteristic information satisfy the predetermined matching condition or do not satisfy a predetermined matching condition. Corresponding monitoring information is separately generated based on the two cases.

The predetermined matching condition includes at least a pixel change degree threshold of the pixel.

Generating monitoring information based on the determining result can specifically include: generating first monitoring information when the determining result indicates that the second characteristic information and the first characteristic information satisfy a predetermined matching condition, where the first monitoring information includes at least stream time period information of the first video, and the first monitoring information is used to indicate that the second video is monitored within a stream time period corresponding to the stream time period information; or generating second monitoring information when the determining result indicates that the second characteristic information and the first characteristic information do not satisfy a predetermined matching condition, where the second monitoring information includes at least stream time period information of the first video, and the second monitoring information is used to indicate that the second video is not monitored within a stream time period corresponding to the stream time period information.

It is worthwhile to note that when the first characteristic information and the second pixel characteristic information satisfy the predetermined matching condition, it can indicate that the second video is the same as the first video, and indicate that the second video is monitored within the stream time period corresponding to the stream time period information. In this case, it can be determined only that the second video is played within the monitored time period, and it cannot be determined whether the video display device plays the second video as required.

In the previous example, a time period required by the advertiser for playing is 12:00 to 13:00, 14:00 to 16:00, and 19:00 to 21:00 every day, a video required to be played is A, and a video monitored by the video broadcast monitoring device in any one of the several time periods is B. After comparison and analysis, it is learned that A matches B in time period 14:00 to 16:00. In this case, it is determined that the second video is monitored within a predetermined time period, but the second video is not monitored within all predetermined time periods. In this case, it can still be determined that the video display device does not display the second video as required.

When the first characteristic information and the second characteristic information do not satisfy the predetermined matching condition, it can indicate that the second video is different from the first video, that is, the advertisement publisher does not play the second video advertisement as required by the advertiser. In this case, the second monitoring information is generated. The second monitoring information is used to indicate that the second video is not monitored within the stream time period corresponding to the stream time period information. For example, a time period for playing the first video that is monitored by the video broadcast monitoring device is 8:30 to 9:00. After analysis and comparison, it is learned that the first video is different from the specified second video.

It can indicate that the second video specified to be played is not monitored within time period 8:30 to 9:00, or a video played within time period 8:30 to 9:00 is not the second video specified to be played.

The generating first monitoring information can specifically include: determining a starting time and an ending time of playing the first video, to obtain stream time period information of the first video; and generating the first monitoring information that includes the stream time period information.

The previous stream time period information can specifically refer to a starting time and an ending time of video playback. For example, it is monitored that the starting time and the ending time of playing the first video are 12:30 and 13:00, and in this case, the stream time period information is 12:30 to 13:00. Prediction time period information can be a time period determined by the advertiser based on actual situations, for example, 9:00 to 12:00 and 14:00 to 20:00 every day. For example, when the monitored time period for playing the first video is 12:30 to 13:00, it is obtained through analysis that the stream time period of the first video is not within the predetermined time period.

In this solution, successful matching can indicate that the second characteristic information is the same as the first characteristic information (which can include: the same pixel change degree, the same stream time period information, etc.), or an error between the second characteristic information and the first characteristic information does not exceed a predetermined threshold. When the matching succeeds, matching success information and the stream time period information of the corresponding video are generated. A matching failure can indicate that a pixel change degree of the second characteristic information is different from a pixel change degree of the first characteristic information, or an error difference between pixel change degrees exceeds a predetermined threshold, stream time period information is different, and length of streaming is different. The second monitoring information is generated when the matching fails. The monitoring information can indicate that a video specified to be played is not monitored within a monitored time period.

S205. Submit the monitoring information to the first server.

It is worthwhile to note that the first server here is configured to: receive the monitoring information transmitted by the video broadcast monitoring device, and analyze the monitoring information to generate prompt information. The first server here can be a server that sends the first pixel characteristic change information to the video broadcast monitoring device, or can be a server that is only configured to receive the monitoring information transmitted by the video broadcast monitoring device and that analyzes the monitoring information. That is, a server that receives the monitoring information transmitted by the video broadcast monitoring device and that analyzes the monitoring information is determined as a server other than the first server, which is also feasible and does not affect the implementation of the present specification.

The monitoring information in step S205 can refer to the first monitoring information (matching success information and video stream time period information) or the second monitoring information in the previous step.

In this step, the video broadcast monitoring device is responsible for submitting, to the first server, the monitoring information corresponding to the matching success or the matching failure. When the matching succeeds, in addition to submitting the matching success information, the video broadcast monitoring device needs to submit at least stream time period information of a monitored video. In this case, assume that the monitored video playback time is 30 minutes and the stream time period is 12:00 to 12:30. In this case, if a video specified to be played is monitored in time period 12:00 to 12:30, it can be proved that the matching succeeds. On the contrary, if the video specified to be played is not monitored in time period 12:00 to 12:30, it is proved that the second video specified to be played is not monitored within time period 12:00 to 12:30.

In addition, it is worthwhile to note that, in a specific transmission process of the monitoring information, transmission frequency can be specified based on actual situations. For example, it can be specified that the monitoring information is transmitted every three minutes (may be set as required) since the playback starts, or is transmitted while monitored, or after video playback is completed, stream time period information (for example, a stream time period is 12:00 to 12:30) of the entire video is transmitted to the first server.

In the method in FIG. 2, the video broadcast monitoring device receives the first characteristic information sent by the first server, and determines, based on the first characteristic information, whether the first video submitted by the video output device matches the second video specified to be monitored, so as to determine whether the video display device plays the specified video within the specified time period. In this method, the broadcast monitoring process can be accurately completed, and advertisement verification efficiency can be improved.

Implementation 2

Figure 3:
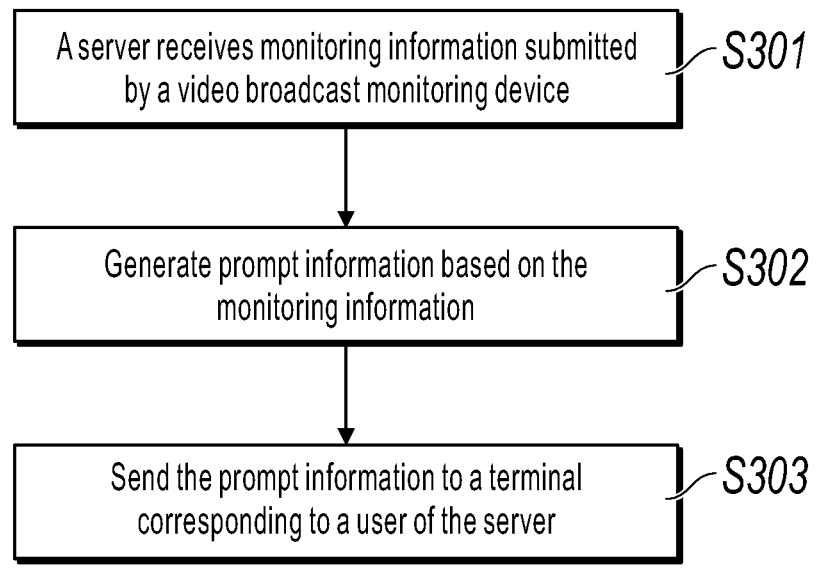
FIG. 3 is a schematic flowchart illustrating a video broadcast monitoring prompt information generation method, according to Implementation 2 of the present specification.

FIG. 3 is a schematic flowchart illustrating a video broadcast monitoring prompt information generation method, according to Implementation 2 of the present specification. From a program perspective, the process can be executed by a program or an application client of the broadcast monitoring cloud server 101 in the video broadcast monitoring system architecture.

As shown in FIG. 3, the video broadcast monitoring prompt information generation method can include the following steps:

S301. A server receives monitoring information submitted by a video broadcast monitoring device, where the video broadcast monitoring device is configured to monitor a video streaming status of a video display device, the monitoring information is generated by the video broadcast monitoring device based on a determining result after determining, based on obtained first characteristic information, whether a first video matches a second video to obtain the determining result, the second video is a video that is to be monitored, e.g., as specified by a user of a server, and the first characteristic information is used to indicate pixel change characteristics of the second video.

The server is configured to receive the monitoring information submitted by the video broadcast monitoring device.

S302. Generate prompt information based on the monitoring information, where the prompt information is used to indicate a streaming status of the second video on the video display device within a specified time period.

Receiving monitoring information submitted by the video broadcast monitoring device can specifically include: receiving first monitoring information submitted by the video broadcast monitoring device, where the first monitoring information includes at least stream time period information, and the first monitoring information is used to indicate that the second video is monitored within a stream time period corresponding to the stream time period information; and after receiving the monitoring information, generating, by the first server, the prompt information based on the monitoring information, so as to remind the user of the server whether the first video played by the video display device in an actual stream time period (the stream time period here refers to the actual stream time period of the first video) is the second video specified to be monitored. For example, the monitoring information received by the first server is that the second video specified to be monitored is not monitored within the stream time period, and the prompt information is generated based on the monitoring information. In this case, the prompt information can indicate that the video specified to be monitored is not monitored within the stream time period, and specific content of the prompt information can be: a matching failure, the second video is not monitored, etc.

S303. Send the prompt information to a terminal corresponding to the user of the server.

After generating the prompt information, the first server needs to send the prompt information to the user of the server, so the user of the server can monitor the streaming status of the video display device in time, and make a corresponding adjustment. For example, still using the previous example, assume that the generated prompt information is a matching failure. In this case, a terminal of the user of the server can analyze the scenarios of missed playing or error playing to find out the reason, and replay the second video.

Based on the method in FIG. 3, in a specific application process, before the video broadcast monitoring device receives the first characteristic information sent by the first server, the method can further include: obtaining, by the server, the second video; analyzing the second video to obtain the first characteristic information of the second video; and sending the first characteristic information to the video broadcast monitoring device.

The first server mentioned in this implementation can be the first server mentioned in Implementation 1. The first server obtains the second video specified to be monitored, and the second video can be sent to the server by the terminal of the user of the server, or can be transmitted by using a wired device. After obtaining the second video specified to be monitored, the first server analyzes the second video. A specific analysis process can include: determining a pixel change degree of each pixel in the second video; where the pixel change degree is a difference between pixel values corresponding to pixels at the same location in a video playback process; and each pixel can include all pixels in the second video; and determining, from the pixels, a set of pixels that satisfy one or more predetermined criteria of the pixel change degree. Specifically, a predetermined number of pixels can be extracted from each pixel in a descending order of pixel change degrees, to determine first characteristic information of the set of pixels. The first characteristic information includes pixel change degree information and location information of each pixel in the set of pixels.

In the previous process of analyzing the second video to obtain the first characteristic information of the second video, location relationships and pixel change degrees of all pixels are first obtained; then, a pixel with a relatively large pixel change degree is selected from the pixels, and a pixel change rule of the pixel bit with a relatively large pixel change degree is selected as an image authenticity verification model of the second video stream; further, the first characteristic information (which can indicate the image authenticity verification model) is sent to the video broadcast monitoring device for matching, and a change rule of the pixel bit with a relatively large change degree is selected as an image authenticity verification model, thereby reducing operating load pressure of the video broadcast monitoring device and improving matching efficiency of the video broadcast monitoring device.

Based on the method in FIG. 3, when the prompt information is generated based on the monitoring information, the first monitoring information submitted by the video stream monitoring device is received. The first monitoring information includes at least stream time period information of the first video. The first monitoring information is used to indicate that the second video is monitored within a stream time period corresponding to the stream time period information.

Whether the stream time period corresponding to the stream time period information of the first video stream is within the stream time period is determined, to obtain a first determining result.

First prompt information is generated when the first determining result indicates that the stream time period is within the specified stream time period range, where the first prompt information is used to indicate that the video stream monitoring device plays the second video within the specified stream time period range.

When the monitoring information received by the first server indicates that the first prompt information is generated within the stream time period corresponding to the stream time period information, the first prompt information indicates that the second video is monitored in the stream time period. However, in this case, it cannot be determined whether the video display device plays the video as required, but it can only be determined that two videos match each other. However, whether the video is played according to a required time of an advertiser cannot be determined after the previous step is completed. For example, the advertiser requires stream time periods of 12:00 to 13:00, 14:00 to 16:00, and 19:00 to 21:00 per day, and length of streaming of each day must be at least 3 hours. In this case, if the video broadcast monitoring device monitors that the first video is played within two time periods 12:00 to 13:00 and 14:00 to 16:00 of a day, but is not played within time period 19 00 to 21:00 of the day, a video streaming status of the day is considered as not being played as required by the advertiser. Therefore, when it is monitored that the first video matches the second video, only matching success information can be obtained, and it cannot be determined whether playback of the first video satisfies a predetermined length or time period requirement.

For example, it is monitored that the first video matches the second video, and a stream time period of the first video is 9:00 to 9:30. In this case, it can be determined that the second video stream specified to be played is played in the time period 9:00 to 9:30, so as to generate the first prompt information. When receiving the first prompt information, the terminal of the user of the server can know that a corresponding video display device plays the second video specified to be played in 9:00 to 9:30. If the video is played within the specified time period, without considering total length of streaming, it can be considered that the second video is played as required.

When the first determining result indicates that the stream time period is within the specified stream time period range, stream time periods of the first video are accumulated to obtain total length of streaming of the first video.

Whether the total length of streaming is greater than or equal to predetermined length of streaming is determined, to obtain a second determining result; and second prompt information is generated when the second determining result indicates that the total length of streaming is greater than or equal to the predetermined length of streaming, where the second prompt information is used to indicate that the video stream monitoring device plays the second video within the stream time period, and the total length of streaming is greater than or equal to the predetermined length of streaming.

For example, when the monitoring information submitted by the video broadcast monitoring device is that the first video played by the video display device successfully matches the second video specified to be monitored, and stream time periods are 9:00 to 9:30, 13:00 to 13:30, 15:00 to 15:30, and 17:00 to 17:30. Assume that predetermined stream time periods are 8:30 to 9:30, 13:00 to 2:00, 15:00 to 16:00, and 17:00 to 18:00, and predetermined length of streaming is greater than or equal to 2 hours. The first server determines that the stream time periods of the first video submitted by the video broadcast monitoring device are within the predetermined stream time periods. In this case, the first server accumulates the stream time periods of the first video to obtain total length of streaming 2 hours, continues to determine whether the total length of streaming satisfies the predetermined length of streaming condition, and generates the second prompt information. When receiving the second prompt information, the terminal of the user of the server knows that the video display device plays the second video specified to be monitored within the specified time periods, and the total length of streaming is greater than or equal to the predetermined length of streaming.

In Implementation 2, the first server analyzes the monitoring information transmitted by the video broadcast monitoring device, mainly analyzes whether the stream time period corresponding to the stream time period information of the successfully matched first video falls within the predetermined stream time periods, and further determines whether the total length of streaming is greater than or equal to the predetermined length of streaming, so as to prevent a video playing party from shortening length of streaming of a video specified to be monitored, and more accurately and comprehensively monitor the streaming status of the second video.

Implementation 3

Figure 4:
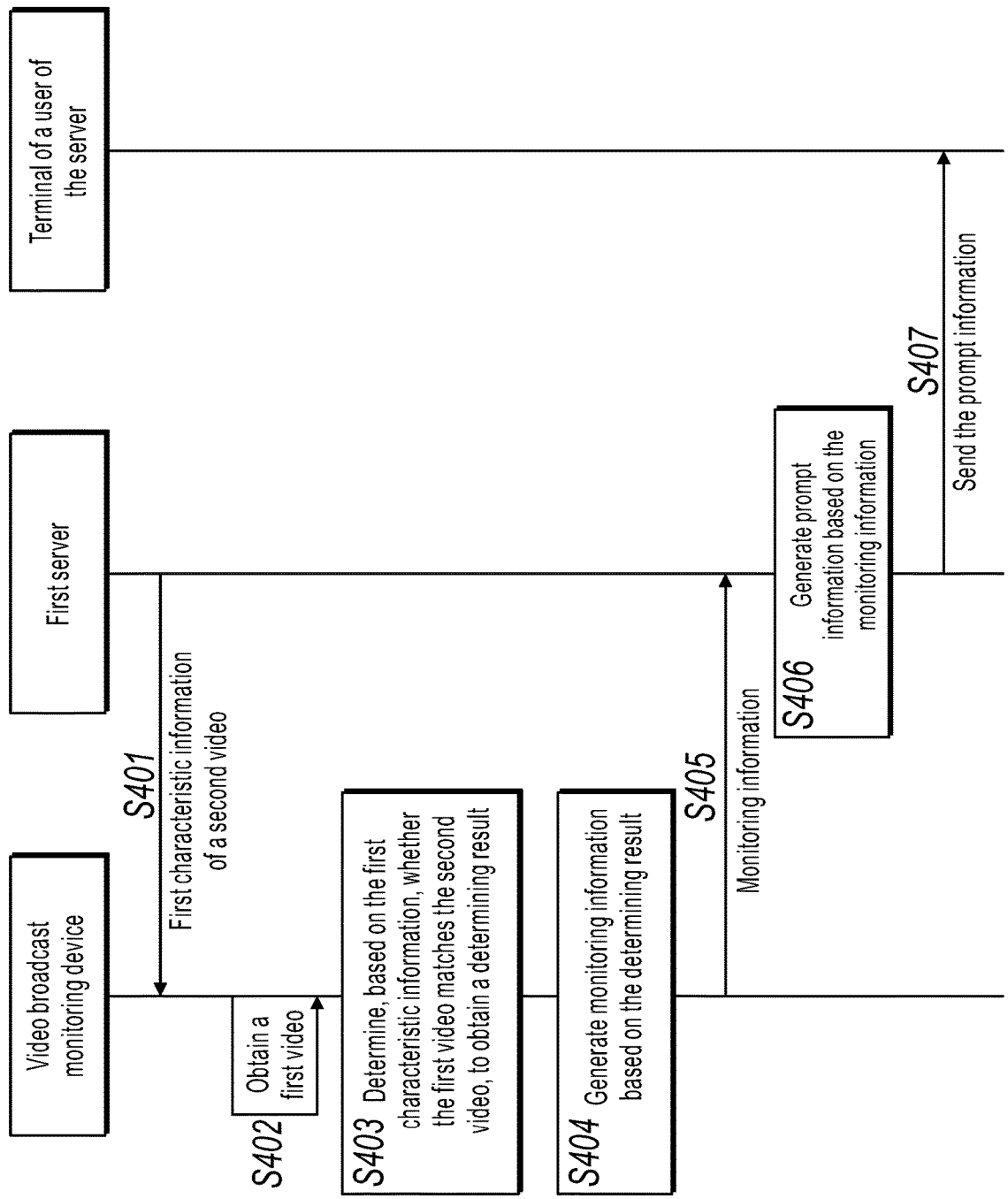
FIG. 4 is a schematic diagram illustrating system signaling interaction of a video broadcast monitoring method, according to Implementation 3 of the present specification.

FIG. 4 is a schematic flowchart illustrating a video broadcast monitoring method, according to Implementation 4 of the present specification. As shown in FIG. 4, the video broadcast monitoring method can include the following steps:

S401. A video broadcast monitoring device obtains first characteristic information of a second video, where the second video is a video that is to be monitored, e.g., as specified by a user of a server, and the first characteristic information is used to indicate pixel change characteristics of the second video.

S402. The video broadcast monitoring device obtains a first video input that is submitted by a video output device to a video display device.

In practice, the first characteristic information in this step can be sent by a first server, or can be sent by a server other than the first server. After obtaining the first characteristic information, the video broadcast monitoring device stores the first characteristic information.

S403. Determine, based on the first characteristic information, whether the first video matches the second video, to obtain a determining result.

S404. Generate monitoring information based on the determining result.

S405. Submit the monitoring information to a first server, and the first server receives the monitoring information submitted by the video broadcast monitoring device.

S406. Generate prompt information based on the monitoring information, where the prompt information is used to indicate a streaming status of the second video on the video display device within a specified time period.

S407. Send the prompt information to a terminal corresponding to the user of the server.

In specific applications, before the video broadcast monitoring device receives the first characteristic information sent by the first server, the method can further include: obtaining, by the first server, the second video that is specified to be monitored; analyzing the second video to obtain the first characteristic information of the second video; and sending the first characteristic information to the video broadcast monitoring device.

A specific determining method can be: calculating a pixel change rule of a pixel bit in the second video in a video image, matching a pixel change of a pixel bit in an image authenticity verification model, and performing matching calculation on an output video stream to obtain a stream time period and a determining result of a corresponding video.

When the prompt information is generated based on the monitoring information, if the monitoring information indicates that the second video is not monitored within a stream time period corresponding to the stream time period information, prompt information indicating that the second video is not monitored can be generated without further determining a stream time period and length of streaming of the monitored video.

If the monitoring information indicates that the second video is monitored within the stream time period corresponding to the stream time period information, subsequent determining can be performed based on actual situations.

For example, if it is not considered that a video displayed by the video display device must be simultaneously played in all specified time periods, and only total length of streaming needs to be greater than or equal to predetermined length of streaming, it can be concluded that the video display device plays the second video as required. For example, the predetermined length of streaming is 3 hours, and the specified stream time period is 8:00 to 12:00 or 14:00 to 20:00. The video broadcast monitoring device monitors that the first video is played repeatedly only within time period 14:00 to 17:00, and total length of streaming is 3 hours. In this case, it can be considered that the video display device plays the second video as required.

If the video displayed by the video display device must be simultaneously played in all the specified time periods and the total length of streaming needs to satisfy the predetermined length, twice determining needs to be performed: for the first time, determining whether the first video is played in all the specified time periods; and for the second time, determining whether the total length of streaming satisfies the predetermined length. For example, the predetermined length of streaming is 3 hours, and the specified stream time periods are 8:00 to 12:00 and 14:00 to 20:00. The video broadcast monitoring device monitors that the stream time periods of the first video are 9:30 to 10:00 and 15:00 to 15:30. In the first determining, the stream time periods of the first video 9:30 to 10:00 and 15:00 to 15:30 belong to the specified stream time periods 8:00 to 12:00 and 14:00 to 20:00; in the second determining, the total length of streaming is 1 hour and less than 3 hours. Therefore, the video display device does not play the second video as required.

According to the method in Implementation 3, pixel comparison and calculation is performed in image frames in the second video specified to be monitored to obtain a partial pixel change characteristic of the second video, and the pixel change characteristic is submitted to the video broadcast monitoring device. The video broadcast monitoring device monitors, based on the pixel change characteristic, whether the first video played in the video display device on an advertisement screen is the video specified to be monitored, thereby completing a broadcast monitoring function and improving broadcast monitoring efficiency.

In practice, the implementation provided in this solution can be applied to any situation in which a broadcast monitoring function needs to be implemented, for example, advertisement verification, television program verification, and teaching video verification. The purpose is to ensure that a video or an image is played in the video display device based on predetermined requirements, so as to avoid a phenomenon of missed playing or error playing.

Figure 5:
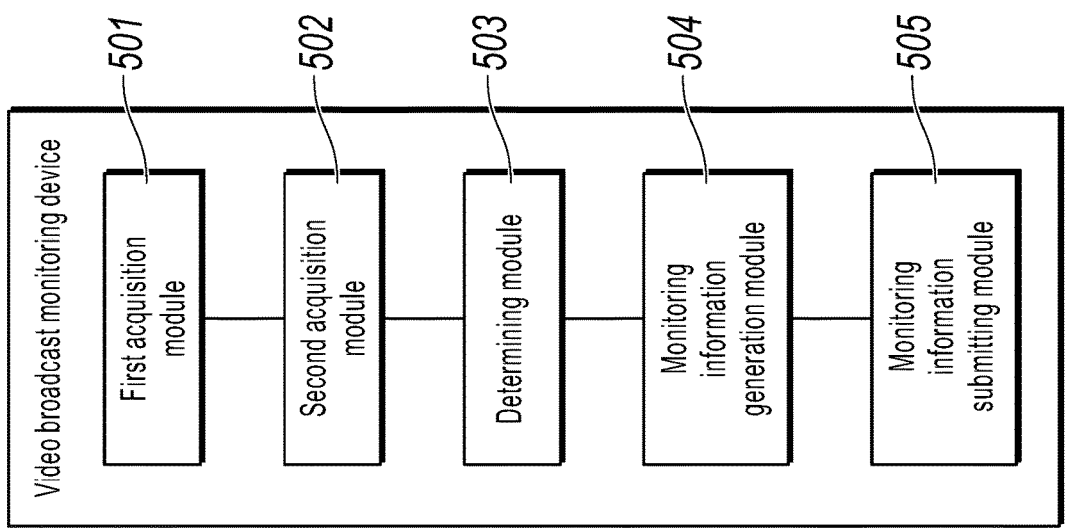
FIG. 5 is a schematic structural diagram illustrating a video broadcast monitoring device that corresponds to FIG. 2, according to an implementation of the present specification.

Based on the same idea, an implementation of the present specification further provides a device that corresponds to the previous method. FIG. 5 is a schematic structural diagram illustrating a video broadcast monitoring device that corresponds to FIG. 2, according to an implementation of the present specification.

As shown in FIG. 5, a video broadcast monitoring device can include: a first acquisition module 501, configured to obtain, by a video broadcast monitoring device, a first video input that is submitted by a video output device to a video display device; a second acquisition module 502, configured to obtain, by the video broadcast monitoring device, first characteristic information of a second video, where the second video is a video that is to be monitored, e.g., as specified by a user of a server, and the first characteristic information is used to indicate pixel change characteristics of the second video; a determining module 503, configured to determine, based on the first characteristic information, whether the first video matches the second video, to obtain a determining result; a monitoring information generation module 504, configured to generate monitoring information based on the determining result; and a monitoring information submitting module 505, configured to submit the monitoring information to a first server.

The device can specifically further include: pixel change characteristics information receiving module, which can be specifically configured to: receive an image authenticity verification model sent by the first server, where the image authenticity verification model is used to indicate a pixel change rule of pixels in the second video that satisfy one or more predetermined criteria.

The determining module 503 can specifically include: each-pixel acquisition unit, configured to obtain each pixel in each frame of image in the first video; a second characteristic information determining unit, configured to determine second characteristic information of each pixel; and a determining unit, configured to determine whether the second characteristic information matches the first characteristic information, to obtain a determining result.

The monitoring information generation module 504 can specifically include: a first monitoring information generation unit, configured to generate first monitoring information when the determining result indicates that the second characteristic information and the first characteristic information satisfy a predetermined matching condition, where the first monitoring information includes at least stream time period information of the first video, and the first monitoring information is used to indicate that the second video is monitored within a stream time period corresponding to the stream time period information.

The monitoring information generation module 504 can specifically further include: a second monitoring information generation unit, configured to generate second monitoring information when the determining result indicates that the second characteristic information and the first characteristic information do not satisfy a predetermined matching condition, where the second monitoring information includes at least stream time period information, and the second monitoring information is used to indicate that the second video is not monitored within a stream time period corresponding to the stream time period information. The first monitoring information generation unit can be specifically configured to: determine a starting time and an ending time of playing the first video, to obtain stream time period information of the first video.

In the device in FIG. 5, the video broadcast monitoring device receives, by using the pixel change characteristic information receiving module, the first characteristic information sent by the first server, and determines, by using the determining module based on the first characteristic information, whether the first video submitted by the video output device matches the second video specified to be monitored, so as to determine whether the video display device plays the specified video within the specified time period. In this method, the broadcast monitoring process can be accurately completed, and advertisement verification efficiency can be improved.

Figure 6:
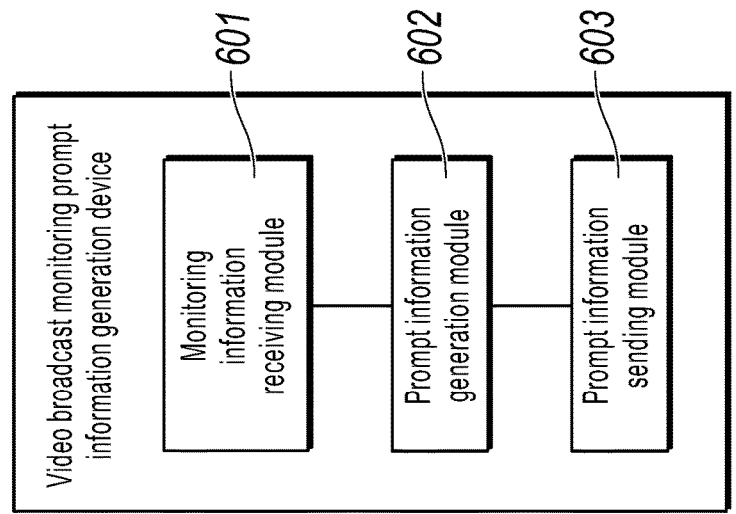
FIG. 6 is a schematic structural diagram illustrating a video broadcast monitoring prompt information generation device that corresponds to FIG. 3, according to an implementation of the present specification.

FIG. 6 is a schematic structural diagram illustrating a video broadcast monitoring prompt information generation device that corresponds to FIG. 3, according to an implementation of the present specification. As shown in FIG. 6, the video broadcast monitoring prompt information generation device can include: a monitoring information receiving module 601, configured to receive monitoring information submitted by a video broadcast monitoring device, where the video broadcast monitoring device is configured to monitor a video streaming status of a video display device; a prompt information generation module 602, configured to generate prompt information based on the monitoring information, where the prompt information is used to indicate a streaming status of a second video by a video display device within a specified time period; and a prompt information sending module 603, configured to send the prompt information to a terminal corresponding to a user of the server.

The device can further include: a second video acquisition module, configured to obtain, by a first server, a second video specified to be monitored; an analysis module, configured to analyze the second video to obtain first characteristic information of the second video; and a sending module, configured to send the first characteristic information to the video broadcast monitoring device.

The analysis module can be specifically configured to: determine a pixel change degree of each pixel in the second video; determine, from the pixels, a set of pixels that satisfy one or more predetermined criteria of the pixel change degree; and determine first characteristic information corresponding to the set of pixels.

The prompt information generation module 602 can be specifically configured to: receive first monitoring information submitted by the video stream monitoring device, where the first monitoring information includes at least stream time period information of a first video, and the first monitoring information is used to indicate that the second video is monitored within a stream time period corresponding to the stream time period information; and the prompt information generation module can specifically include: a determining unit, configured to determine whether the stream time period corresponding to the stream time period information of the first video stream is within the stream time period, to obtain a first determining result; and a first prompt information generation unit, configured to generate first prompt information when the first determining result indicates that the stream time period is within the specified stream time period range, where the first prompt information is used to indicate that the video stream monitoring device plays the second video within the specified stream time period range.

The first prompt information generation unit can be specifically further configured to: when the first determining result indicates that the stream time period is not within the specified stream time period range, accumulate the stream time periods of the first video to obtain total length of streaming of the first video; determine whether the total length of streaming is greater than or equal to predetermined length of streaming, to obtain a second determining result; and generate second prompt information when the second determining result indicates that the total length of streaming is greater than or equal to the predetermined length of streaming, where the second prompt information is used to indicate that the video stream monitoring device plays the second video within the stream time period range, and the total length of streaming is greater than or equal to the predetermined length of streaming.

The device in FIG. 6 analyzes, by using the analysis module, the monitoring information transmitted by the video broadcast monitoring device, mainly analyzes whether the stream time period corresponding to the stream time period information of the successfully matched first video falls within the predetermined stream time periods, and further determines, by using the determining module, whether the total length of streaming is greater than or equal to the predetermined length of streaming, so as to prevent a video playing party from shortening length of streaming of a video specified to be monitored, and more accurately and comprehensively monitor the streaming status of the second video.

Based on the same idea, an implementation of the present specification further provides a device that corresponds to the previous method.

Figure 7:
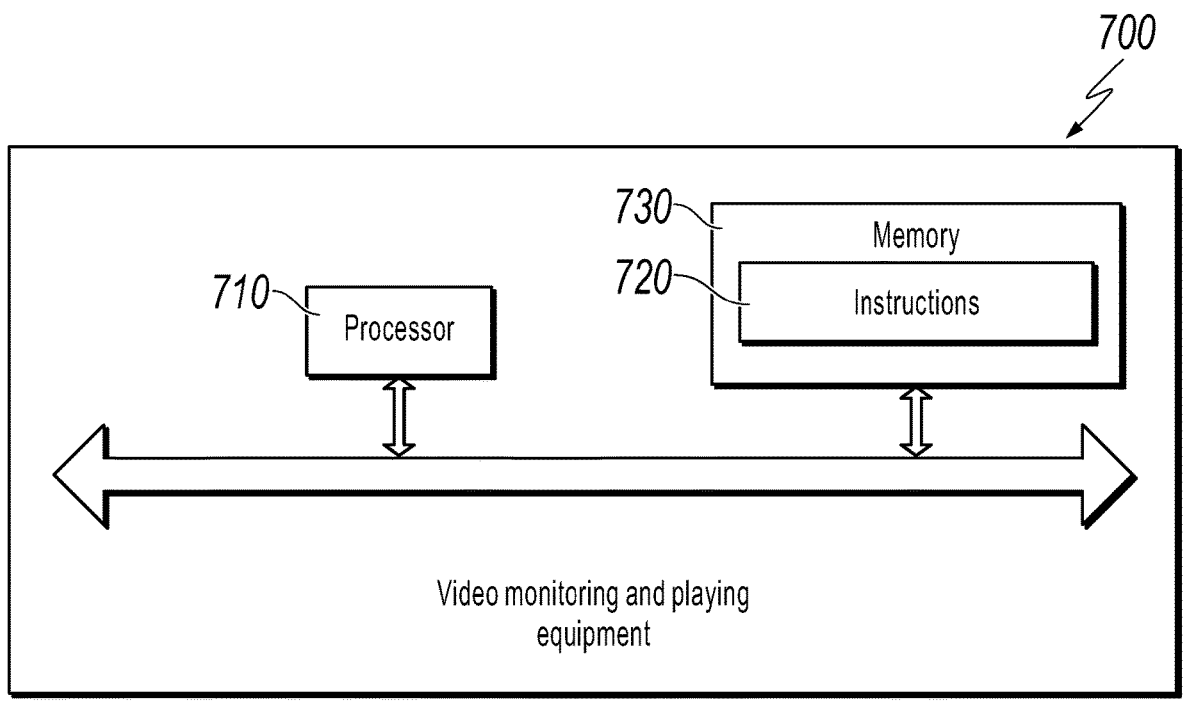
FIG. 7 is a schematic structural diagram illustrating a video broadcast monitoring device that corresponds to FIG. 2, according to an implementation of the present specification.

FIG. 7 is a schematic architectural diagram illustrating a video broadcast monitoring device, according to an implementation of the present specification. As shown in FIG. 7, the device 700 can include: at least one processor 710; and a memory 730 communicatively connected to the at least one processor; where the memory 730 stores instructions 720 that can be executed by the at least one processor 710, and the instructions are executed by the at least one processor 710.

Corresponding to Implementation 1, the instructions can enable the at least one processor 710 to obtain a first video input that is submitted by a video output device to a video display device; obtain first characteristic information of a second video, where the second video is a video that is to be monitored, e.g., as specified by a user of a server, and the first characteristic information is used to indicate pixel change characteristics of the second video; determine, based on the first characteristic information, whether the first video matches the second video, to obtain a determining result; generate monitoring information based on the determining result; and submit the monitoring information to a first server.

Figure 8:
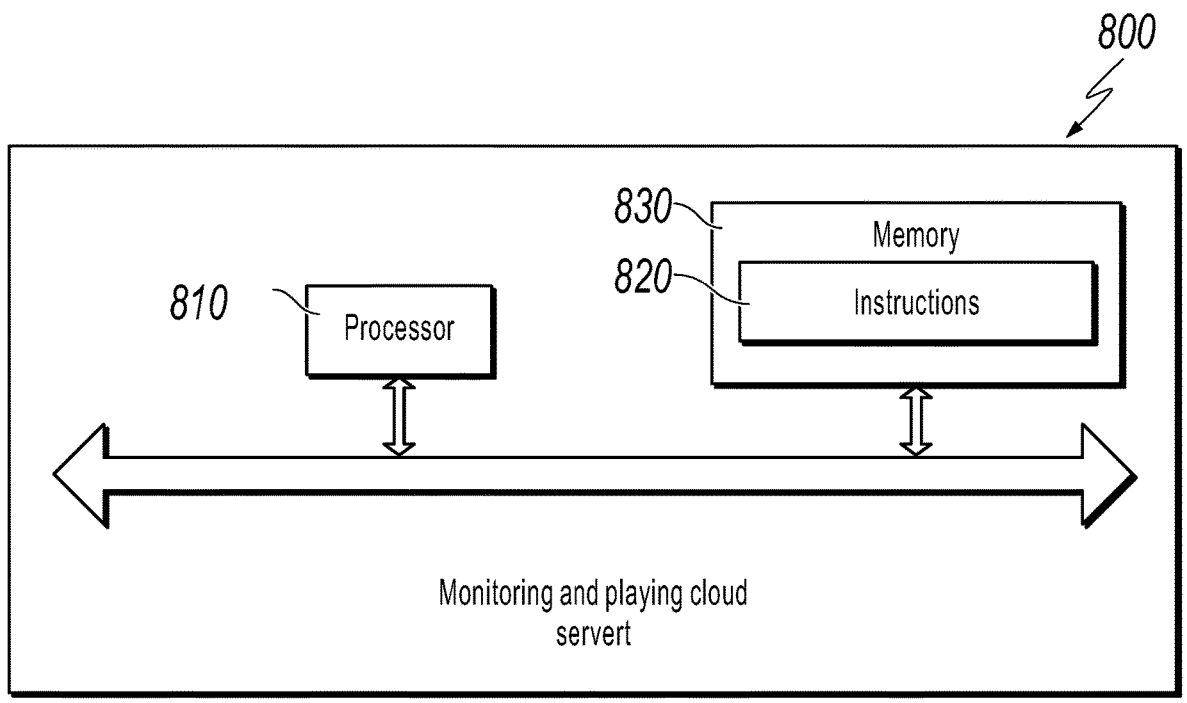
FIG. 8 is a schematic architectural diagram illustrating a video broadcast monitoring prompt information generation device that corresponds to FIG. 3, according to an implementation of the present specification.

FIG. 8 is a schematic architectural diagram illustrating a video broadcast monitoring prompt information generation device that corresponds to FIG. 3, according to an implementation of the present specification. As shown in FIG. 8, the device 800 can include: at least one processor 810; and a memory 830 communicatively connected to the at least one processor; where the memory 830 stores instructions 820 that can be executed by the at least one processor 810, and the instructions are executed by the at least one processor 810.

Corresponding to Implementation 2, the instructions can enable the at least one processor 810 to receive monitoring information submitted by a video broadcast monitoring device, where the video broadcast monitoring device is configured to monitor a video streaming status of a video display device, the monitoring information is generated by the video broadcast monitoring device based on a determining result after determining, based on obtained first characteristic information, whether a first video matches a second video to obtain the determining result, the second video is a video that is to be monitored, e.g., as specified by a user of a server, and the first characteristic information is used to indicate pixel change characteristics of the second video; generate prompt information based on the monitoring information, where the prompt information is used to indicate a streaming status of the second video on the video display device within a specified time period; and send the prompt information to a terminal corresponding to the user of the server.

Corresponding to Implementation 3, a video broadcast monitoring system includes: a video broadcast monitoring device, a first server (a broadcast monitoring cloud server), a video output device, and a video display device.

The video broadcast monitoring device includes: at least one first processor; and a first memory communicatively connected to the at least one first processor; where the first memory stores first instructions that can be executed by the at least one first processor, and the first instructions are executed by the at least one first processor, to enable the at least one first processor to: obtain a first video input that is submitted by the video output device to the video display device; obtain first characteristic information of a second video, where the second video is a video that is to be monitored, e.g., as specified by a user of the server, and the first characteristic information is used to indicate pixel change characteristics of the second video; determine, based on the first characteristic information, whether the first video matches the second video, to obtain a determining result; generate monitoring information based on the determining result; and submit the monitoring information to the first server.

The first server includes: at least one second processor; and a second memory communicatively connected to the at least one second processor; where the second memory stores second instructions that can be executed by the at least one second processor, and the second instructions are executed by the at least one second processor, to enable the at least one second processor to: receive monitoring information submitted by the video broadcast monitoring device, where the video broadcast monitoring device is configured to monitor a video streaming status of the video display device, the monitoring information is generated by the video broadcast monitoring device based on a determining result after determining, based on obtained first characteristic information, whether the first video matches the second video to obtain the determining result, the second video is a video that is to be monitored, e.g., as specified by the user of the server, and the first characteristic information is used to indicate pixel change characteristics of the second video; generate prompt information based on the monitoring information, where the prompt information is used to indicate a streaming status of the second video on the video display device within a specified time period; and send the prompt information to a terminal corresponding to the user of the server.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present application is implemented, a function of each unit can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts of the implementations, references can be made to the implementations mutually. Each implementation focuses on a difference from other implementations. Particularly, a system implementation is similar to a method implementation, and therefore is described briefly. For related parts, references can be made to related descriptions in the method implementation.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method, comprising:
    obtaining, by a video broadcast monitoring device, a first video that is provided by a video output device for presentation by a video display device;
    obtaining, by the video broadcast monitoring device, first characteristic information of a second video, wherein the second video is a video that is to be monitored by the video broadcast monitoring device, and the first characteristic information indicates pixel change characteristics of the second video;
    determining, by the video broadcast monitoring device and based on the first characteristic information, whether the first video matches the second video, to obtain a result of the determining, wherein the determining comprises:
        determining a pixel change degree of each pixel in the first video;
        determining, from pixels in the first video, a set of pixels that satisfy one or more predetermined criteria related to the pixel change degree;
        determining second characteristic information of the set of pixels, wherein the second characteristic information indicates pixel change characteristics of the first video; and
        determining whether the second characteristic information matches the first characteristic information, to obtain the result of the determining;
    generating, by the video broadcast monitoring device, monitoring information that includes the result of the determining; and
    providing, by the video broadcast monitoring device and to a server, the monitoring information.

2. The computer-implemented method of claim 1, further comprising:
    before obtaining the first video that is provided by the video output device for presentation by the video display device, receiving, by the video broadcast monitoring device and from the server, the first characteristic information, wherein the first characteristic information has been obtained by the server through analysis of the second video.

3. The computer-implemented method of claim 2, wherein receiving the first characteristic information comprises:
    receiving, by the video broadcast monitoring device and from the server, an image authenticity verification model, wherein the image authenticity verification model indicates a pixel change rule of pixels in the second video according to one or more predetermined criteria.

4. The computer-implemented method of claim 1, wherein generating monitoring information that includes the result of the determining comprises:
    in response to the result of the determining indicating that the second characteristic information and the first characteristic information satisfy a predetermined matching condition, generating first monitoring information, wherein the first monitoring information comprises at least stream time period information of the first video, and the first monitoring information indicates that the second video is monitored by the video broadcast monitoring device within a stream time period corresponding to the stream time period information.

5. The computer-implemented method of claim 1, wherein generating monitoring information that includes the result of the determining comprises:
    in response to the result of the determining indicating that the second characteristic information and the first characteristic information do not satisfy a predetermined matching condition, generating second monitoring information, wherein the second monitoring information comprises at least stream time period information of the first video, and the second monitoring information indicates that the second video is not monitored within a stream time period corresponding to the stream time period information.

6. A non-transitory, computer-readable medium storing one or more instructions executable by a computer system to perform operations comprising:
    obtaining, by a video broadcast monitoring device, a first video that is provided by a video output device for presentation by a video display device;
    obtaining, by the video broadcast monitoring device, first characteristic information of a second video, wherein the second video is a video that is to be monitored by the video broadcast monitoring device, and the first characteristic information indicates pixel change characteristics of the second video;

determining, by the video broadcast monitoring device and based on the first characteristic information, whether the first video matches the second video, to obtain a result of the determining, wherein the determining comprises:

determining a pixel change degree of each pixel in the first video;

determining, from pixels in the first video, a set of pixels that satisfy one or more predetermined criteria related to the pixel change degree;

determining second characteristic information of the set of pixels, wherein the second characteristic information indicates pixel change characteristics of the first video; and determining whether the second characteristic information matches the first characteristic information, to obtain the result of the determining;

generating, by the video broadcast monitoring device, monitoring information that includes the result of the determining; and providing, by the video broadcast monitoring device and to a server, the monitoring information.

7. The computer-readable medium of claim 6, further comprising:

before obtaining the first video that is provided by the video output device for presentation by the video display device, receiving, by the video broadcast monitoring device and from the server, the first characteristic information, wherein the first characteristic information has been obtained by the server through analysis of the second video.

8. The computer-readable medium of claim 7, wherein receiving the first characteristic information comprises:

receiving, by the video broadcast monitoring device and from the server, an image authenticity verification model, wherein the image authenticity verification model indicates a pixel change rule of pixels in the second video according to one or more predetermined criteria.

9. The computer-readable medium of claim 6, wherein generating monitoring information that includes the result of the determining comprises:

in response to the result of the determining indicating that the second characteristic information and the first characteristic information satisfy a predetermined matching condition, generating first monitoring information, wherein the first monitoring information comprises at least stream time period information of the first video, and the first monitoring information indicates that the second video is monitored by the video broadcast monitoring device within a stream time period corresponding to the stream time period information.

10. The computer-readable medium of claim 6, wherein generating monitoring information that includes the result of the determining comprises:

in response to the result of the determining indicating that the second characteristic information and the first characteristic information do not satisfy a predetermined matching condition, generating second monitoring information, wherein the second monitoring information comprises at least stream time period information of the first video, and the second monitoring information indicates that the second video is not monitored within a stream time period corresponding to the stream time period information.

11. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining, by a video broadcast monitoring device, a first video that is provided by a video output device for presentation by a video display device;

obtaining, by the video broadcast monitoring device, first characteristic information of a second video, wherein the second video is a video that is to be monitored by the video broadcast monitoring device, and the first characteristic information indicates pixel change characteristics of the second video;

determining, by the video broadcast monitoring device and based on the first characteristic information, whether the first video matches the second video, to obtain a result of the determining, wherein the determining comprises:

determining a pixel change degree of each pixel in the first video;

determining, from pixels in the first video, a set of pixels that satisfy one or more predetermined criteria related to the pixel change degree;

determining second characteristic information of the set of pixels, wherein the second characteristic information indicates pixel change characteristics of the first video; and determining whether the second characteristic information matches the first characteristic information, to obtain the result of the determining;

generating, by the video broadcast monitoring device, monitoring information that includes the result of the determining; and providing, by the video broadcast monitoring device and to a server, the monitoring information.

12. The computer-implemented system of claim 11, further comprising:

before obtaining the first video that is provided by the video output device for presentation by the video display device, receiving, by the video broadcast monitoring device and from the server, the first characteristic information, wherein the first characteristic information has been obtained by the server through analysis of the second video.

13. The computer-implemented system of claim 12, wherein receiving the first characteristic information comprises:

receiving, by the video broadcast monitoring device and from the server, an image authenticity verification model, wherein the image authenticity verification model indicates a pixel change rule of pixels in the second video according to one or more predetermined criteria.

14. The computer-implemented system of claim 11, wherein generating monitoring information that includes the result of the determining comprises:

in response to the result of the determining indicating that the second characteristic information and the first characteristic information satisfy a predetermined matching condition, generating first monitoring information, wherein the first monitoring information comprises at least stream time period information of the first video, and the first monitoring information indicates that the second video is monitored by the video broadcast monitoring device within a stream time period corresponding to the stream time period information.

15. The computer-implemented system of claim 11, wherein generating monitoring information that includes the result of the determining comprises:

in response to the result of the determining indicating that the second characteristic information and the first characteristic information do not satisfy a predetermined matching condition, generating second monitoring information, wherein the second monitoring information comprises at least stream time period information of the first video, and the second monitoring information indicates that the second video is not monitored within a stream time period corresponding to the stream time period information.

* * * * *